US008898430B2

(12) United States Patent
Chakrala et al.

(10) Patent No.: US 8,898,430 B2
(45) Date of Patent: Nov. 25, 2014

(54) FAULT HANDLING IN ADDRESS TRANSLATION TRANSACTIONS

(71) Applicant: ARM Limited, Cambridge (GB)

(72) Inventors: Viswanath Chakrala, Bangalore (IN); Timothy Nicholas Hay, Cherry Hinton (GB); Stuart David Biles, Bury St Edmunds (GB)

(73) Assignee: ARM Limited, Cambridge (GB)

( * ) Notice: Subject to any disclaimer, the term of this patent is extended or adjusted under 35 U.S.C. 154(b) by 177 days.

(21) Appl. No.: 13/705,316

(22) Filed: Dec. 5, 2012

(65) Prior Publication Data

US 2014/0156949 A1  Jun. 5, 2014

(51) Int. Cl.
*G06F 12/10* (2006.01)
*G06F 12/08* (2006.01)

(52) U.S. Cl.
CPC .................................. *G06F 12/0808* (2013.01)
USPC ............................ 711/207; 711/205; 711/144

(58) Field of Classification Search
CPC ...... G06F 2212/68–2212/684; G06F 12/0806; G06F 12/0808; G06F 12/0815–12/0842; G06F 12/0844; G06F 12/0855; G06F 12/0857; G06F 12/0891
See application file for complete search history.

(56) References Cited

U.S. PATENT DOCUMENTS

| 5,060,137 | A  | * | 10/1991 | Bryg et al. ..................... 711/205 |
| 8,504,794 | B1 | * | 8/2013  | Glasco et al. .................. 711/207 |
| 2006/0184772 | A1 | | 8/2006 | Dooley et al. |
| 2007/0245099 | A1 | | 10/2007 | Gray et al. |
| 2008/0282056 | A1 | * | 11/2008 | Bond ............................. 711/207 |
| 2013/0262816 | A1 | * | 10/2013 | Ronen et al. .................. 711/207 |

OTHER PUBLICATIONS

UK Search Report dated Apr. 4, 2014 in GB 1318356.1.

* cited by examiner

*Primary Examiner* — April Y Blair
*Assistant Examiner* — Jason Blust
(74) *Attorney, Agent, or Firm* — Nixon & Vanderhye P.C.

(57) ABSTRACT

A data processing apparatus having a memory configured to store tables having virtual to physical address translations, a cache configured to store a subset of the virtual to physical address translations and cache management circuitry configured to control transactions received from the processor requesting virtual address to physical address translations. The data processing apparatus identifies where a faulting transaction has occurred during execution of a context and whether the faulting transaction has a transaction stall or transaction terminate fault. The cache management circuitry is responsive to identification of the faulting transaction having a transaction terminate fault to invalidate all address translations in the cache that relate to the context of the faulting transaction such that a valid bit associated with each entry in the cache is set to invalid for the address translations.

20 Claims, 4 Drawing Sheets

FAULT HANDLING IN ADDRESS TRANSLATION TRANSACTIONS

TECHNICAL FIELD

The technical field relates to the field of data processing and in particular, to the translations of virtual to physical addresses within data processing systems.

BACKGROUND

Data processing systems may use virtual addresses to indicate storage locations while the processing system uses locations identified by physical addresses to actually store the data in. The use of virtual addresses may be done for a number of reasons such as to reduce the number of bits required to identify an address location within software, or to allow several processes to access a restricted memory space.

A complete set of current mappings for the virtual to physical addresses are stored in memory, however in order to decrease access time to these mappings, recently used mappings are stored in caches called table lookaside buffers or TLBs that can be accessed more quickly by the processor.

Where a transaction has a fault the transaction may need to be stalled or terminated depending on the fault. Transactions of the same context that follow the faulting transaction will also need to be terminated or stalled depending on the fault. It may take some time for the processor to recognise that a fault has occurred and to identify the fault and in the meantime further transactions will have been issued. As the TLBs store translations that are quick to access, they might return translations that have been requested for transactions following faulting transactions. It is therefore important that they receive information regarding faulting transactions so that the flow of transactions can be controlled.

In order for transactions accessing the cache to determine whether a translation is for a transaction following a faulting transaction, information regarding this has previously been stored in the TLB in the form of two indicator bits associated with each entry. These bits indicated that a fault had occurred for that transaction and whether the fault was a terminate fault or a stall fault. This allowed the system to deal with the transactions in the appropriate way.

As there are often many TLBs and each have many entries, this is expensive in area.

It would be desirable to be able to control transactions following faults without too large an area overhead.

SUMMARY OF THE INVENTION

A first aspect of the present invention provides a data processing apparatus comprising:
 a processor for processing a stream of instructions;
 a hierarchical memory system comprising a cache, a memory and cache management circuitry;
 said processor identifying storage locations using virtual addresses and said memory system storing data using physical addresses, said memory being configured to store tables comprising virtual to physical address translations, said cache being configured to store a subset of said virtual to physical address translations, said cache management circuitry being configured to control transactions received from said processor requesting virtual address to physical address translations; wherein
 said data processing apparatus is configured to identify where a faulting transaction has occurred during execution of a context and whether said faulting transaction has a transaction stall or transaction terminate fault;
 said cache management circuitry is configured:
  to respond to identification of said faulting transaction and to said faulting transaction having a transaction terminate fault to invalidate all address translations in said cache that relate to said context of said faulting transaction such that a valid bit associated with each entry in said cache is set to invalid for said address translations, invalid entries being available for update and not forming part of any lookup in said cache; and
  to respond to identification of said faulting transaction and to said faulting transaction having a transaction stall fault to set a stall indicator associated with all address translations in said cache that relate to said context of said faulting transaction.

The technology described herein recognises that although information regarding whether a faulting transaction is a stalled or a terminated transaction may be present in control circuitry within the data processing apparatus, replicating it within a cache that can be accessed quickly has a high area overhead. It also recognises that caches are already provided with valid bits which are used to indicate whether an entry in the cache is currently valid. This indicator is used during deletion of an entry for example, where a deleted entry is simply marked as invalid and the cache access circuitry will no longer look at that entry and the entry will be preferentially selected for any update. Thus, as this valid indicator is already present the present technique recognised that it could be used where a faulting transaction has a terminate fault. This would be acceptable as if the entries in the cache for this context are marked as invalid then any access to these translations by subsequent transactions will only find invalid entries and therefore cannot return a value and thus, the rapid access to these values that circumvents some of the control circuitry is avoided. Furthermore, where the faulting transaction is a stall transaction then this information is stored within the cache and transactions from the same context that access this cache will discover that the context has been stalled. In this way, sufficient information is provided within the cache within a single bit that allows the system to operate correctly whether the faulting transaction is a stall transaction or a terminate transaction.

In some embodiments, said cache comprises a table lookaside buffer and for each address translation comprises a virtual address, a corresponding physical address, a context identifier, a set of attributes, a valid bit and said stall indicator.

The cache may be a table look aside buffer and store for each address translation, the virtual address, the corresponding physical address, a context identifier, a set of attributes indicating attributes of that address space such as read only or security indicators and a stall indicator indicating whether the context has been stalled. The cache may store other information too depending on the embodiment.

In some embodiments, said data processing apparatus further comprises translation control circuitry comprising a control register configured to store previous context fault indicators for each context being processed, said previous context fault indicator bits indicating whether a next transaction in a context can proceed or cannot proceed.

Although the information that a context has had a faulting transaction within it identified can be stored in a number of ways, in some embodiments it is stored in a control register as a previous context fault indicator in translation control circuitry. This control register can be accessed by other circuitry processing transactions from the context which can then take appropriate action. Its location in translation control circuitry which is in the form of a block of control circuitry, allows the information to be accessible to other processes.

In some embodiments, said cache management circuitry is configured to detect a faulting transaction for a context by detecting that said previous context fault indicator indicates that a next transaction in a context cannot proceed.

The cache management circuitry may detect faulting transactions from the context fault indicator. This is located in the translation control circuitry and when the translation control circuitry updates the register it may transmit a signal to the cache management circuitry indicating that this faulting transaction has occurred.

In some embodiments, said data processing apparatus further comprises translation control circuitry comprising a control register configured to store context fault configuration indicators, said context fault configuration indicators indicating whether a fault is a stall fault.

In addition to storing information indicating that a fault has occurred, an indicator indicating the type of fault may also be stored.

In some embodiments, said cache management circuitry is configured to detect whether a faulting transaction has a terminate fault or a stall fault from said context fault configuration indicator.

In addition to discovering that a fault has occurred from an indicator bit in control circuitry the cache management circuitry can determine what type of fault it is from the context fault configuration indicator. This too may be sent as a control signal to the cache management circuitry when the register is updated.

In some embodiments, said cache management circuitry is further configured in response to detecting said faulting transaction with said stall fault to store said faulting transaction with said stall fault in said transaction queue and to set said stall indicator associated with said stored transaction.

Although in some cases when the faulting transaction with the stall fault is detected it may simply be discarded, in some embodiments it is stored in the transaction queue with the stall indicator associated with it. Storing the faulting transaction in the transaction queue provides the data processing apparatus with the opportunity to either re-try the transaction or terminate it later as required.

In some embodiments, said processor is configured to issue a resume instruction for a context that has been stalled when said context is to be resumed, said cache management circuitry being configured in response to said resume instruction to reset said stall indicators associated with said cache entries for said context and to reset said stall indicator associated with pending transactions of said context in said queue of transactions.

A stalled context is resumed in response to a resume instruction from the processor. The cache management circuitry is configured such that in response to this resume instruction it resets the stall indicators associated with each cache entry for that context and resets the stall indicator associated with pending transaction of the context in the queue of transactions. By resetting the stall indicators in the cache any subsequent access to an entry in the cache for that context with not return the stall indicator and therefore will simply provide a hit. Furthermore, the transactions that were stalled in the pending queue can, when their stall indicator has been reset, be issued from the queue in their turns.

In some embodiments, said data processing apparatus further comprises translation control circuitry comprising a write only resume register configured to store a terminate or retry indicator, said resume register being configured to generate a control signal when written, said cache management circuitry being responsive to said control signal to either terminate said first stalled transaction in said transaction queue for said context or to reset said stall indicator associated with said transaction such that said transaction is retried in dependence upon said value written to said resume register and to reset said stall indicator associated with all other stalled transactions for said context.

The resume instruction may be sent to the cache management circuitry in a number of ways, however in some embodiments it is sent via a write only register located on translation control circuitry. In response to the register being written to it will automatically generate a control signal to the cache management circuitry; this control signal will include the indicator value such that the cache management circuitry will know either to terminate the first stalled instruction for that context or to re-issue it. The other stalled transactions will be reissued, and the stall indicator in all the entries in the translation lookaside buffer will be reset.

In some embodiments, said processor is configured to issue a resume instruction for a context that has been stalled, said translation control circuitry being configured to update said previous context fault indicator for said context in response to said resume instruction.

When the resume instruction is received the translation control circuitry should also update the previous context fault indicator for that context such that the circuitry knows that subsequent instructions for this context may proceed.

Although the faulting transaction may have a number of forms, provided the faults in the transaction are such that it cannot complete, some examples of the faults may be a permission fault wherein the transaction is trying to access some portion of memory that it is now allowed to access, an external fault caused by an external signal, a translation match conflict fault wherein the transaction may perhaps be a write to an address which is in a read only section of memory or it may simply be that the address size is wrong or that the cache is locked.

In some embodiments, the data processor apparatus further comprises page table walk table control circuitry within said translation control circuitry, said memory management control circuitry being configured to transmit transactions requiring a page table walk from said transaction queue to said translation control circuitry and said translation control circuitry is configured to determine if a received transaction is for a context for which said previous context fault indicator is set and if it is said translation control circuitry is configured to terminate said transaction and if it is not said translation control circuitry is configured to forward said transaction to said page table walk table control circuitry.

Where a translation is not found in the cache then a page table walk will need to be performed where the page tables in the memory that store the current complete set of translations are accessed. This is performed under page table walk control circuitry and in some embodiments this is found within the translation control circuitry which also has the registers indicating when a context has had a faulting transaction. Thus, where a transaction that requires a page table walk is transmitted to this control circuitry it can determine if the context of the transaction is the context that has had a faulting transaction previously. In such a case the transaction can be terminated. In this way, the transactions of a context where a terminate fault has occurred will be terminated at this stage even though at the cache stage they may simply have met an invalid entry. It should be noted that terminate faults are rare and thus, any overhead associated with queuing and forwarding the transactions to the translation control circuitry will be small.

In some embodiments, the data processing apparatus comprises a plurality of translation buffer units each comprising said cache, said cache management circuitry and said transaction queue, said data processing apparatus further comprising translation control circuitry comprising control registers and page table walk control circuitry for controlling memory accesses to retrieve address translations from memory, each of said translation buffer units communicating with said translation control circuitry via a bus.

In some data processing apparatus there may be many masters, such as DMAs, graphic processing units GPUs and other devices that each have a translation buffer unit associated with them. All of these translation buffer units communicate via a bus with the translation control circuitry that controls the page table walks. It is this arrangement that means that although the translation control circuitry may have the information regarding the type of fault stored in its control registers this information is not readily available to the translation buffer units, and as such it is desirable to store this information in these units. In order not to affect access times to the cache it is desirable if the information is available within the cache, or at least sufficient information is available such that the transactions are managed correctly.

A second aspect provides a method of handling faults within address translation circuitry in a data processing apparatus, the data processing apparatus comprising:
  a processor for processing a stream of instructions;
  a hierarchical memory system comprising a cache a memory and cache management circuitry;
  said processor identifying storage locations using virtual addresses and said memory system storing data using physical addresses, said memory being configured to store tables comprising virtual to physical address translations, said cache being configured to store a subset of said virtual to physical address translations, said cache management circuitry being configured to control transactions received from said processor requesting virtual address to physical address translations;
  said method comprising the steps of:
  identifying where a faulting transaction has occurred and whether said faulting transaction has a transaction stall or transaction terminate fault;
  responding to identification of said faulting transaction and to said faulting transaction having a transaction terminate fault by invalidating all address translations in said cache that relate to said context of said faulting transaction; and
  responding to identification of said faulting transaction and to said faulting transaction having a transaction stall fault by setting a stall indicator associated with all address translations in said cache that relate to said context of said faulting transaction.

A third aspect provides a data processing apparatus comprising:
  processing means for processing a stream of instructions;
  a hierarchical memory system comprising a caching means, a memory and cache management means;
  said processor means identifying storage locations using virtual addresses and said memory system storing data using physical addresses, said memory being configured to store tables comprising virtual to physical address translations, said cache being for storing a subset of said virtual to physical address translations, said cache management means being for controlling transactions received from said processing means requesting virtual address to physical address translations; wherein said data processing apparatus is configured to identify where a faulting transaction has occurred during execution of a context and whether said faulting transaction has a transaction stall or transaction terminate fault;
said cache management means is for:
  responding to identification of said faulting transaction and to said faulting transaction having a transaction terminate fault by invalidating all address translations in said cache that relate to said context of said faulting transaction such that a valid bit associated with each entry in said cache is set to invalid for said address translations, invalid entries being available for update and not forming part of any lookup in said cache; and
  for responding to identification of said faulting transaction and to said faulting transaction having a transaction stall fault by setting a stall indicator associated with all address translations in said cache that relate to said context of said faulting transaction.

The above, and other objects, features and advantages of this invention will be apparent from the following detailed description of illustrative embodiments which is to be read in connection with the accompanying drawings.

DESCRIPTION OF THE EXAMPLE NON-LIMITING EMBODIMENTS

Figure 1:
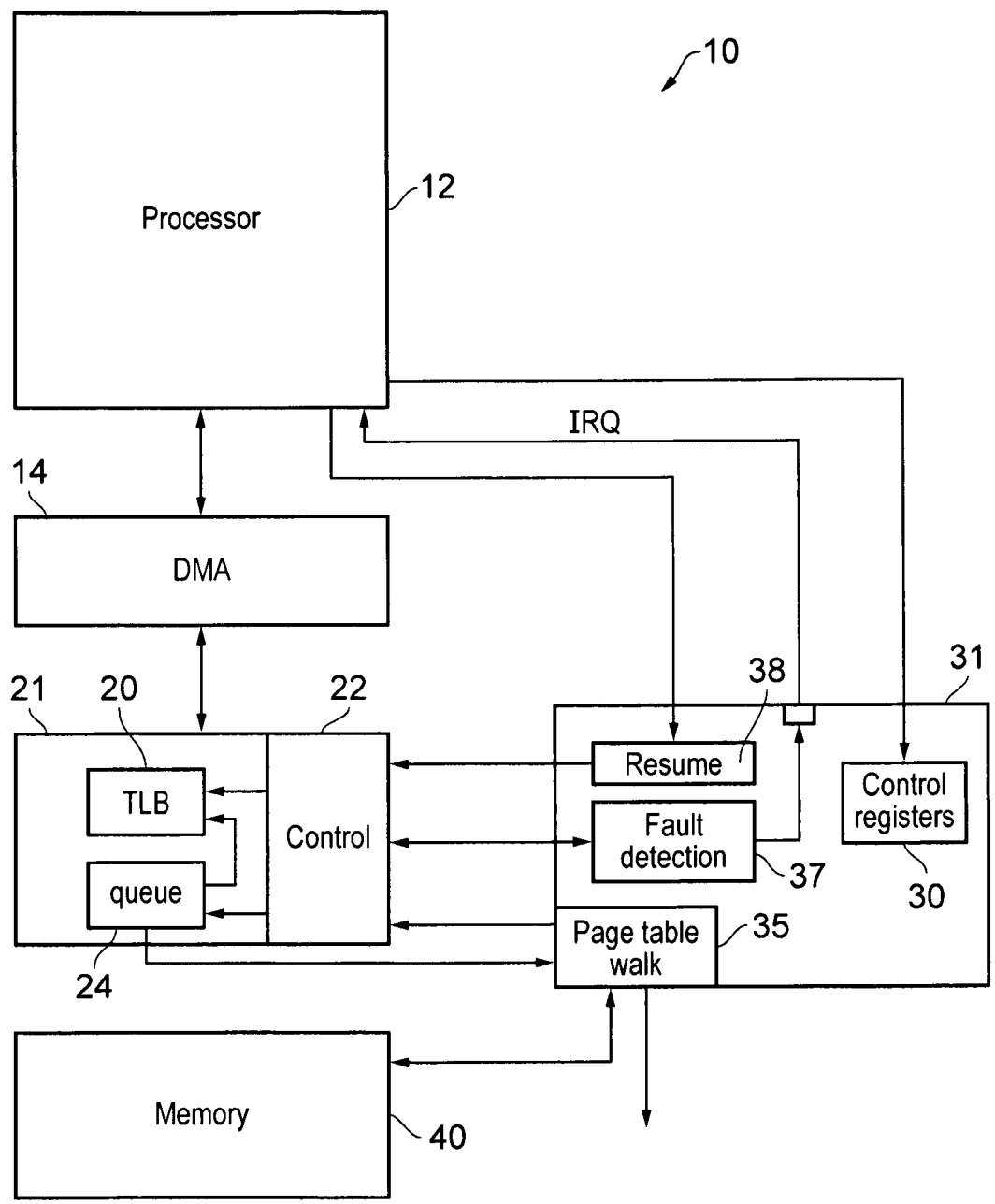
FIG. 1 shows a data processing system according to an embodiment of the present invention.

FIG. 1 shows a data processing system 10 having a processor 12 for processing a stream of instructions. Processor 10 issues transactions to various devices not all shown. Data accesses to memory are issued as transaction requests to DMA or direct memory access unit 14. As the processor uses virtual addresses in its programs and the memory uses physical addresses to store the data, the DMA 14 will need to find the physical address corresponding to the virtual address of any request it receives before it can retrieve the data. Thus, transactions in the form of translation requests requesting translations of the virtual addresses are transmitted to a translation buffer unit 21. A lookup is performed in the translation lookaside buffer TLB 20 within the translation buffer unit 21 to see if the translation is stored therein.

The TLB 20 caches recently used translations to increase performance and if there is a hit in the TLB the physical address is output such that the data can be accessed from the memory. If there is not a hit then control circuitry 22 within the translation buffer unit 21 transmits the transaction to the queue 24. Transactions are issued from the queue 24 to translation control unit 31 which comprises page table walk control circuitry 35. A page table walk will then be performed under control of the page table walk control circuitry 35 in order to retrieve the translation from memory 40. The translation will then be stored in TLB 20 and provided to the requesting transaction.

Memory 40 contains page tables of virtual to physical address translations so that where these translations are not stored in the TLB 20 they can be retrieved from memory.

Control circuitry 22 is associated with TLB 20 and queue 24 and controls the flow of transactions.

If a fault is detected in a transaction, for example if the request is a write request to a region of memory that is a read only region then this detection of a fault is transmitted to fault detection circuitry 37 within translation control unit 31 and an interrupt is generated and issued to processor 12.

The fault may be detected in the translation buffer unit 21 or in the translation control unit 31, in either case, the information is transmitted between the two devices, such that sufficient information is provided to the translation control unit so that it knows which transaction is the first transaction in the transaction stream to have generated a fault. In this regard, a fault may be detected in one transaction while an earlier transaction is still awaiting execution in queue 24. The translation buffer unit is the only device aware of this and therefore the translation control unit must check whether there are any earlier transactions for the context that had a faulting transaction within it and if there are, if they are faulting transactions or not. Once this information is known, translation control unit 31 can transmit an interrupt to the processor with information regarding which transaction has faulted.

On receiving the interrupt processor 12 will then stop processing the context or thread that generated this interrupt and will examine the transaction where the fault occurred and will indicate to the translation control unit 31, (1) that a fault has occurred in this context and (2) whether that fault is a stall fault or a terminate fault. It will do this by setting the relevant bits in control registers 30.

These registers will then communicate this information to translation buffer unit 21.

The difference between a terminate and stall fault results in the processor either terminating all transactions for that context following the terminate fault or stalling transactions following the stalled transaction for that context. A terminate fault can be viewed as a real fault in that an error has occurred and the processor needs to either re-try that instruction or address the error in some ways. All instructions that followed that faulting instruction should be terminated. A stall fault is different. In some cases, the processor may want to receive an interrupt to indicate to it that it has reached a particular point in the program and therefore, it may intentionally put a fault in some part of the system such that a particular transaction will generate this fault. The processor will then recognise that it has reached this point and it can perform whatever action may be required and it can resume when it determines it should. It does this by issuing a resume instruction, which triggers a write to resume register 38, which is a write only register and in response to being written to automatically triggers a control signal to be sent to translation buffer unit 21. The value written to the resume register indicates whether the stalled transaction should be retried or terminated, all transactions subsequent to the faulting transaction should be allowed to proceed.

As should be understood, the time it takes for the processor to receive the interrupt and recognize that there has been a fault is a reasonable length of time and during this time the processor may have issued several more transactions for that context. Now, although the translation control unit 31 will receive control information from the processor 12 in the form of bits being set in control registers 30 indicating that there has been a fault there is also the translation buffer unit 21 that processes transactions. Embodiments of the present invention have recognized that providing an indicator for each entry in the TLB 20 indicating either a stall or terminate fault would require an extra 2 bits per entry which is a large overhead. They have therefore addressed this by providing only a single fault dedicated indicator for each entry in the TLB 20. In response to a control signal received from translation control circuitry 31 that there has been a faulting transaction and which indicates the nature of that faulting transaction, the control signal being sent automatically when the control registers 30 in translation control unit 31 are updated with this information, control circuitry 22 will either set the dedicated fault indicator to indicate a stalled transaction in the TLB or it will set the valid bit to invalid for all transactions stored in the TLB for the context where a faulting transaction has occurred.

The use of the valid indicator to indicate a terminate fault is acceptable as a transaction that arrives at the TLB and discovers its matching entry is invalid will miss in the TLB and will therefore be forwarded to queue 24 for a page table walk. Page table walk is under control of page table walk control circuitry 35 and as this is located in translation control unit 31 along with control registers 30, the page table walk control circuitry 35 will be aware that the context should be terminated and it will terminate the page table walk without executing it.

When a transaction is received from DMA 14 that hits a transaction in TLB 20 that has a stall indicator associated with it, then control circuitry 22 will put it in queue 24 with a stall indicator associated with it. Control circuitry 22 will not issue this transaction from the queue until it has received a signal from translation control unit 31 indicating that the stalled transactions are to resume. At this point it will reset the stall indicator bits associated with that context in TLB 20 and will reset the stall indicators associated with that context in the queue 24. The transactions will then be issued from the queue and they will access the TLB first to check for a match and only if one is not found will a page table walk be required. In some embodiments with particular stall handling protocols all but the first stalled transaction should hit in the TLB as the reason they are stored in the queue is that they hit a stalled transaction in the TLB.

Figure 2:
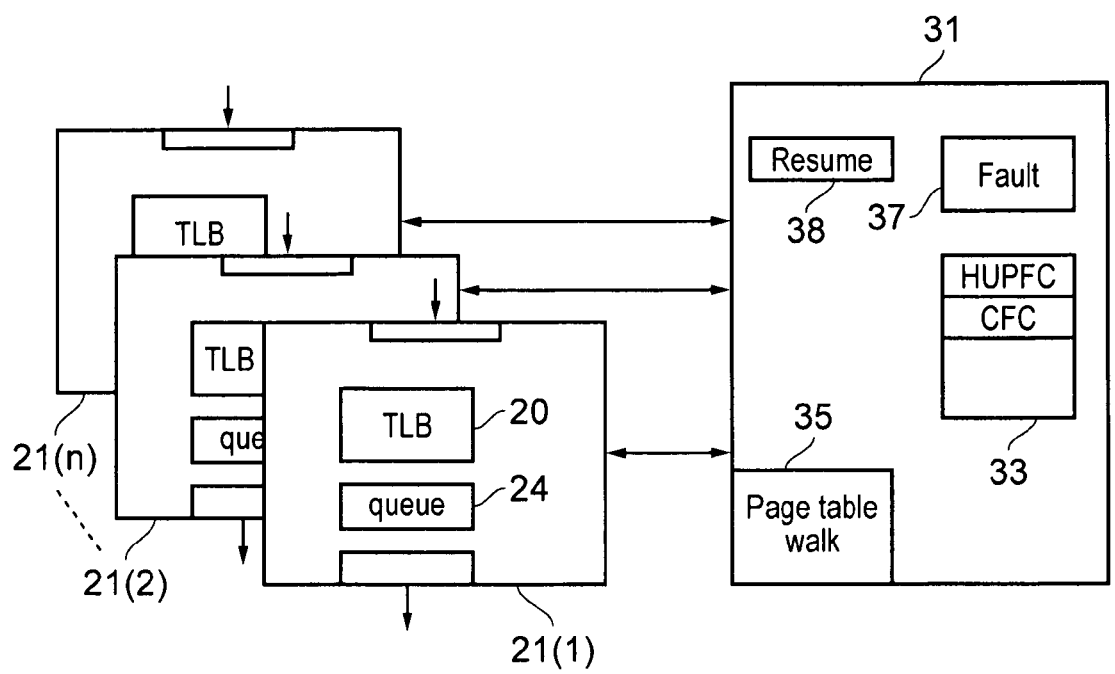
FIG. 2 shows translation buffer and control circuitry according to an embodiment of the present invention.

FIG. 2 shows a plurality of translation buffer units 21(1) to 21(n) and translation control circuitry 31 of a further embodiment. In this embodiment there are several translation buffer units 21(1) to 21(n) each corresponding to a different master. It should be noted that in some known systems there are perhaps 32 different masters and therefore 32 translation buffer units. As can be appreciated with this many units it is desirable to keep their area as small possible.

Each translation buffer unit 21 has a TLB 20 and a transaction queue 24 as in FIG. 1 and each communicates with the translation control unit 31 via different buses. The translation control unit 31 contains the page table walk control circuitry 35 and control registers 33 for storing HUPCFs indicator that indicate a hit under a previous context fault, this indicator being set by the software in the processor in response to detecting a faulting transaction in the context. In this embodiment if it is set to a 1 there is no detected fault in that context and if it is set to a 0 then there is a fault in that context. There is also a register for storing CFC indicator bits which is the context fault configuration bit and this is set if the fault is a stalled fault. The processor updates the HUPCF and the CFC bits and a signal is sent to the relevant translation buffer unit 21 and if the CFC indicates that the fault is a stall fault then the entries in the TLB 20 of that unit that relate to that context have a stall indicator set and any transactions that hit one of these entries will go to the transaction queue with a stall bit set. They will not be issued from the queue until that stall bit is cleared.

If the CFC bit indicates that the fault is a terminate fault then the corresponding entries in the TLB 20 will be set to invalid. This means that any transaction that would have hit one of these entries will simply be sent to the transaction queue to perform a page table walk. When this page table walk is to be performed the translation control unit 31 will recognise that this is a transaction from a terminated stream of transactions and will simply terminate the transaction without performing the page table walk.

In the case that the context is a stalled context, when the processor wishes to resume the context it will issue a resume instruction which will write the resume register 38 in the translation control unit 31. Writing of the resume register 38 will trigger a control signal to be sent to the appropriate translation buffer unit 21 which will clear the stall indicators associated with this context in TLB 20 and will clear the stall indicators associated with the transactions in transaction queue 24. These transactions can then proceed. They will not be sent immediately to the page table walk but will be sent to the TLB first to check that the translation they are looking for is not stored therein.

Figure 3:
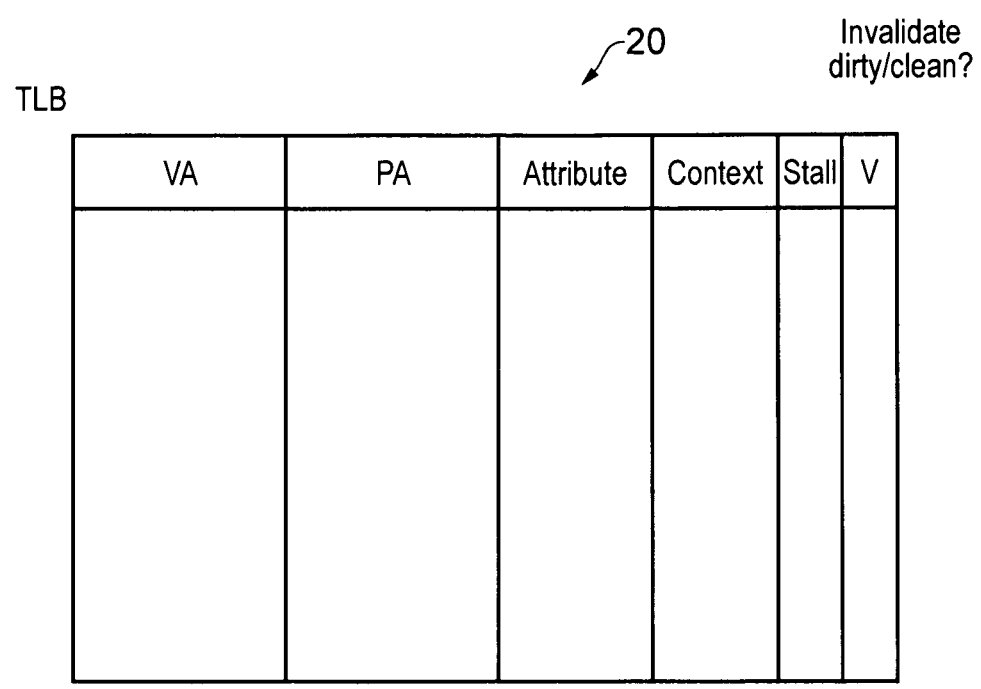
FIG. 3 shows a translation look aside buffer according to an embodiment of the present invention.

FIG. 3 shows an example of TLB 20 showing individual entries. In this embodiment each entry has a virtual address, a physical address, an attribute entry which is a set of attributes indicating such things as whether that transaction should be a read, write or have a particular security setting, and a context identifier identifying the context of that transaction. There is also the stall indicator indicating whether or not the translation is from a context where the context is stalled and a valid bit indicating whether the entry in the cache is valid or not. Valid bits are present in caches and are used for deleting an entry, the bit is simply set to invalid, rather than performing a far more power intensive operation of clearing the entry.

It should be noted that in some embodiments these buffers are quite large, typically 128 lines long and there will generally be one for each master and there may be say 32 masters. Thus, as can be seen these TLBs take up a significant amount of area and increasing the width of each entry by even one bit can have a significant impact on area.

Figure 4:
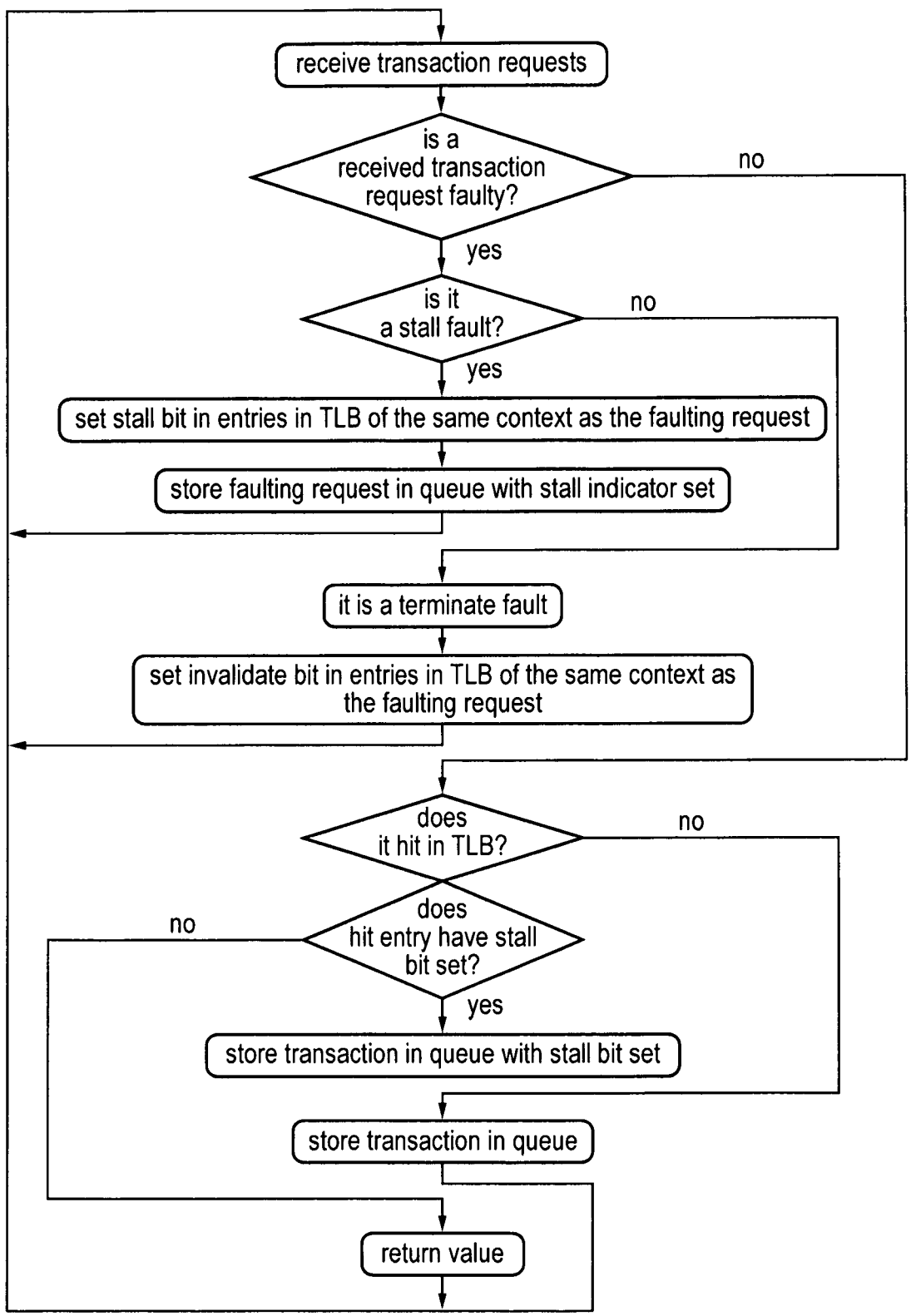
FIG. 4 shows a flow diagram illustrating steps in the method according to an embodiment of the present invention.

FIG. 4 shows a flow diagram illustrating steps in a method according to an embodiment of the present invention. Transaction requests are received at the translation buffer unit 21 of FIG. 1 or 2 and are duly processed. If it is determined that the received transaction request is faulty and if the fault was a stall fault then stall indicator bits are set in all the entries in the TLB that have the same context as the faulting transaction and the faulting transaction is itself stored in the transaction queue in the transaction buffer unit along with a stall indicator. If the faulting transaction does not have a stall fault then it must have a terminate fault and the valid bits of the entries in the TLB for that same context are set to invalid and the transaction for which a terminate fault has been detected is terminated.

If a received transaction request is not faulty then a lookup is performed in the TLB and it is determined if there is a hit. If there is not a hit in the TLB then the transaction is stored in the transaction queue 24. If there is a hit in the TLB then it is determined if the entry hit has its stall bit set. If it does not have its stall bit set then the value that is stored in the TLB is output and one proceeds with the next transaction. If the entry does have its stall bit set then the transaction is stored in the transaction queue and a stall bit is set alongside that transaction such that the transaction is not issued from the transaction queue until that stall bit is cleared.

If a request is received that would have hit an invalid entry in the TLB this is not seen as a hit as the invalid entries are not looked at and therefore a miss occurs and the transaction is forwarded to the queue to be sent to the translation control unit later for a page table walk or if it is from a terminated context to be terminated.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

We claim:

1. A data processing apparatus comprising:
   a processor for processing a stream of instructions;
   a hierarchical memory system comprising a cache, a memory and cache management circuitry;
   said processor identifying storage locations using virtual addresses and said memory system storing data using physical addresses, said memory being configured to store tables comprising virtual to physical address translations, said cache being to configured to store a subset of said virtual to physical address translations, said cache management circuitry being configured to control transactions received from said processor requesting virtual address to physical address translations; wherein
   said data processing apparatus is configured to identify where a faulting transaction has occurred during execution of a context and whether said faulting transaction has a transaction stall or transaction terminate fault;
   said cache management circuitry is configured:
   to respond to identification of said faulting transaction and to said faulting transaction having a transaction terminate fault to invalidate all address translations in said cache that relate to said context of said faulting transaction such that a valid bit associated with each entry in said cache is set to invalid for said address translations, invalid entries being available for update and not forming part of any lookup in said cache; and
   to respond to identification of said faulting transaction and to said faulting transaction having a transaction stall fault to set a stall indicator associated with all address translations in said cache that relate to said context of said faulting transaction.

2. A data processing apparatus according to claim 1, wherein said cache comprises a table lookaside buffer and for each address translation comprises a virtual address, a corresponding physical address, a context identifier, a set of attributes, a valid bit and said stall indicator.

3. A data processing apparatus according to claim 1, wherein
   said data processing apparatus further comprises translation control circuitry comprising a control register configured to store previous context fault indicators for each context being processed, said previous context fault indicator bits indicating whether a next transaction in a context can proceed or cannot proceed.

4. A data processing apparatus according to claim 3, said cache management circuitry being configured to detect a faulting transaction for a context by detecting that said previous context fault indicator indicates that a next transaction in a context cannot proceed.

5. A data processing apparatus according to claim 1, wherein
   said data processing apparatus further comprises translation control circuitry comprising a control register configured to store context fault configuration indicators, said context fault configuration indicators indicating whether a fault is a stall fault.

6. A data processing apparatus according to claim 5, said cache management circuitry being configured to detect whether a faulting transaction has a terminate fault or a stall fault from said context fault configuration indicator.

7. A data processing apparatus according to claim 1, said cache management circuitry comprising a transaction queue for storing a plurality of pending transactions;

said cache management circuitry being configured in response to receiving a transaction requesting a translation in said cache that has a stall indicator set, to stall said transaction by storing said transaction in said transaction queue and setting a stall indicator associated with said stored transaction, said cache management circuitry being configured to retain said transaction within said queue and not to allow said transaction to proceed further while said stall indicator is set.

8. A data processing apparatus according to claim 7, wherein said cache management circuitry is further configured in response to detecting said faulting transaction with said stall fault to store said faulting transaction with said stall fault in said transaction queue and to set said stall indicator associated with said stored transaction.

9. A data processing apparatus according to claim 7, said processor being configured to issue a resume instruction for a context that has been stalled when said context is to be resumed, said cache management circuitry being configured in response to said resume instruction to reset said stall indicator associated with said cache entries for said context and to reset said stall indicator associated with pending transactions of said context in said queue of transactions.

10. A data processing apparatus according to claim 8, said data processing apparatus further comprises translation control circuitry comprising a write only resume register configured to store a terminate or retry indicator, said resume register being configured to generate a control signal when written, said cache management circuitry being responsive to said control signal to either terminate said first stalled transaction in said transaction queue for said context or to reset said stall indicator associated with said transaction such that said transaction is retried in dependence upon said value written to said resume register and to reset said stall indicators associated with all other stalled transactions for said context.

11. A data processing apparatus according to claim 3, said processor being configured to issue a resume instruction for a context that has been stalled, said translation control circuitry being configured to update said previous context fault indicator for said context in response to said resume instruction.

12. A data processing apparatus according to claim 1, wherein said faulting transaction comprises one of an access flag fault, a permission fault, an external fault, a translation match conflict fault, a cache lock fault and an address size fault.

13. A data processing apparatus according to claim 3, further comprising page table walk control circuitry within said translation control circuitry, said memory management control circuitry being configured to transmit transactions requiring a page table walk from said transaction queue to said translation control circuitry and said translation control circuitry being configured to determine if a received transaction is for a context for which said previous context fault indicator is set and if it is said translation control circuitry is configured to terminate said transaction and if it is not said translation control circuitry is configured to forward said transaction to said page table walk table control circuitry.

14. A data processing apparatus according to claim 7, comprising a plurality of translation buffer units each comprising said cache, said cache management circuitry and said transaction queue, said data processing apparatus further comprising translation control circuitry comprising control registers and page table walk table control circuitry for controlling memory accesses to retrieve address translations from memory, each of said translation buffer units communicating with said translation control circuitry via a bus.

15. A method of handling faults within address translation circuitry in a data processing apparatus, the data processing apparatus comprising:

a processor for processing a stream of instructions;

a hierarchical memory system comprising a cache a memory and cache management circuitry;

said processor identifying storage locations using virtual addresses and said memory system storing data using physical addresses, said memory being configured to store tables comprising virtual to physical address translations, said cache being configured to store a subset of said virtual to physical address translations, said cache management circuitry being configured to control transactions received from said processor requesting virtual address to physical address translations;

said method comprising the steps of:

identifying where a faulting transaction has occurred and whether said faulting transaction has a transaction stall or transaction terminate fault;

responding to identification of said faulting transaction and to said faulting transaction having a transaction terminate fault by invalidating all address translations in said cache that relate to said context of said faulting transaction; and responding to identification of said faulting transaction and to said faulting transaction having a transaction stall fault by setting a stall indicator associated with all address translations in said cache that relate to said context of said faulting transaction.

16. A method according to claim 15, comprising the further steps of:

receiving a further transaction;

looking for a translation for said transaction in said cache;

in response to finding said translation in said cache with said stall indicator bit set forwarding said transaction to a transaction queue and setting a stall indicator associated with said transaction in said transaction queue;

not issuing said transaction from said transaction queue until said stall bit is cleared.

17. A method according to claim 15, comprising the further steps of:

receiving a further transaction;

looking for a translation for said transaction in said cache;

in response to not finding said translation in said cache forwarding said transaction to a transaction queue.

18. A method according to claim 16, comprising the further steps of:

receiving a resume signal for a context;

resetting said stall indicators associated with said entries in said cache for said context; and resetting said stall indicators associated with transactions in said queue for said context.

19. A method according to claim 16, comprising the further steps of:

receiving a resume signal for a context, said resume signal including an indicator indicating whether said faulting stalled signal should be retried or terminated;

resetting said stall indicators associated with said entries in said cache for said context; and determining said first stalled transaction for said context in said queue and either resetting said stall indicator associated with said transaction or terminating said transaction in dependence upon said indicator associated with said resume signal; and resetting said stall indicators associated with transactions in said queue for said context.

20. A data processing apparatus comprising:

means for processing a stream of instructions;

a hierarchical memory system comprising a means for caching, a memory and means for cache management;

said means for processing configured to identify storage locations using virtual addresses and said memory system storing data using physical addresses, said memory being configured to store tables comprising virtual to physical address translations, said means for caching being for storing a subset of said virtual to physical address translations, said means for cache management being for controlling transactions received from said means for processing requesting virtual address to physical address translations; wherein said data processing apparatus is configured to identify where a faulting transaction has occurred during execution of a context and whether said faulting transaction has a transaction stall or transaction terminate fault;

said means for cache management is configured to:
respond to identification of said faulting transaction and to said faulting transaction having a transaction terminate fault by invalidating all address translations in said means for caching that relate to said context of said faulting transaction such that a valid bit associated with each entry in said means for caching is set to invalid for said address translations, invalid entries being available for update and not forming part of any lookup in said means for caching; and respond to identification of said faulting transaction and to said faulting transaction having a transaction stall fault by setting a stall indicator associated with all address translations in said means for caching that relate to said context of said faulting transaction.

* * * * *